US012399767B1

United States Patent
Breitenbach et al.

(10) Patent No.: US 12,399,767 B1
(45) Date of Patent: Aug. 26, 2025

(54) SYSTEMS AND METHODS FOR AUTOMATICALLY DETECTING ROOT CAUSE FAILURES

(71) Applicant: SAP SE, Walldorf (DE)

(72) Inventors: Tim Breitenbach, Mitgenfeld (DE); Patrick Jahnke, Leimen/Baden-Württemberg (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 18/590,437

(22) Filed: Feb. 28, 2024

(51) Int. Cl.
*G06F 11/07* (2006.01)
(52) U.S. Cl.
CPC ................ *G06F 11/079* (2013.01)
(58) Field of Classification Search
CPC .................................................. G06F 11/079
See application file for complete search history.

(56) References Cited

U.S. PATENT DOCUMENTS

2017/0153936 A1* 6/2017 Vorganti ............... G06F 11/079
2019/0324831 A1* 10/2019 Gu ....................... G06F 11/0775
2022/0012143 A1* 1/2022 Meeran ............... G06F 11/0751

OTHER PUBLICATIONS

Yinfang Chen et al., "Empowering Practical Root Cause Analysis by Large Language Models for Cloud Incidents," arXiv:2305.15778v3 [cs. SE] May 31, 2023.
Yilun Liu et al., "LogPrompt: Prompt Engineering Towards Zero-Shot and Interpretable Log Analysis," Beijing University of Posts and Telecommunications, China. University of Science and Technology of China, China. arXiv:2308.07610v1 [cs.SE] Aug. 15, 2023.
Shizhuo Dylan Zhang et al., "PACE-LM: Prompting and Augmentation for Calibrated Confidence Estimation with GPT-4 in Cloud Incident Root Cause Analysis," arXiv:2309.05833v3 [cs.CL] Sep. 29, 2023. vol. 1, No. 1, Article. Publication date: Oct. 2023.
Z. Jiang et al., "LLMParser: A LLM-based Log Parsing Framework," The Chinese University of Hong Kong, Shenzhen, China, hepinjia@cuhk.edu.cn arXiv:2310.01796v1 [cs.SE] Oct. 3, 2023.

* cited by examiner

*Primary Examiner* — Jigar P Patel
(74) *Attorney, Agent, or Firm* — Fountainhead Law Group, PC

(57) ABSTRACT

Systems and Methods for Automatically Detecting Root Cause Failures Described herein are techniques for automatically detecting root cause failures in a computing environment. A data center may experience a critical system failure that renders the data center inoperable. An administrator may utilize a root cause detector to analyze alerts generated from the data center to automatically detect the root cause of the critical system failure. Once detected, the administrator may investigate the device with the root cause failure to repair the data center. In some examples, the root cause detector may compare alerts received from the data center with root cause failures in a failure repository that it is familiar with to determine whether the present sequence of alerts is similar to alert patterns it has seen before. The root cause detector may be implemented with a classifier model, a large language model, a rule-based heuristics identifying spurious alert patterns, or combinations of these techniques.

20 Claims, 7 Drawing Sheets

SYSTEMS AND METHODS FOR AUTOMATICALLY DETECTING ROOT CAUSE FAILURES

BACKGROUND

Unless otherwise indicated herein, the approaches described in this section are not prior art to the claims in this application and are not admitted to be prior art by inclusion in this section.

Data centers consist of a collection of devices. These devices can include switches, routers, and servers. Each device is assembled of components. For example, a server contains of CPUs, a mainboard and memory modules to name a few. Each device within a data center is capable of generating alerts which serve to share information relating to the status of the device with a user or administrator of the data center environment. The alerts may provide information gathered during the alert generation such as which device generated the alert and also issues within the device. The issues can range from a minor issue such as abnormal function within the device to a major issue such as device failure.

In the production environment, a failure of one device in a data center may impact other devices within the data center since the devices are interconnected. The failure of a single device or a combination of failures in multiple devices may lead to a critical failure or outage. In order to repair the failed components, the device causing the root cause of the failure must be identified and repaired. Thus, there is a need to automatically detect root cause failures.

DETAILED DESCRIPTION

Described herein are methods and apparatuses to automatically detect root cause failures in a computing environment. In one example, the computing environment is a data center environment but in other examples, the computing environment can be other computing infrastructures where there are many interconnected devices. Multiple devices in the computing environment may be capable of generating alerts. The alerts may include non-critical alerts and critical alerts. In some embodiments, the computing environment may experience a critical system failure or outage and a root cause detector is configured to receive alerts generated by devices within computing environment and to analyze those alerts to automatically detect the root cause of the system failure or outage. Analysis of the alerts may uncover the malfunctioning device within the computing environment and how it is malfunctioning. In other embodiments, the root cause detector may analyze the alerts prior to a system failure or outage. The analysis of the alerts may reveal malfunctions or other issues within the computing environment that if not repaired soon, may lead to a system failure or outage. By having the root cause failure automatically detected, an administrator or user of the computing environment may apply counteractions or resolutions to the malfunctions or other issues before they lead to a catastrophic system failure. It may be advantageous for an administrator of the computing environment to be able to automatically detect a device causing a root cause failure since it would save the time and effort required to troubleshoot the system. It may also be advantageous for an administrator to be able to automatically predict that a device is about to fail since repair of the device would prevent a failure from ever occurring. While the following examples are going to describe the system as detecting a root cause failure after a system failure or outage has occurred, it is to be understood by those skilled in the art that the same techniques may be utilized to predict a root cause failure for a system failure or outage before it happens. For example, the system may predict the degradation of a module in the server and by changing the module, we have prevented a critical system failure from occurring.

Figure 1:
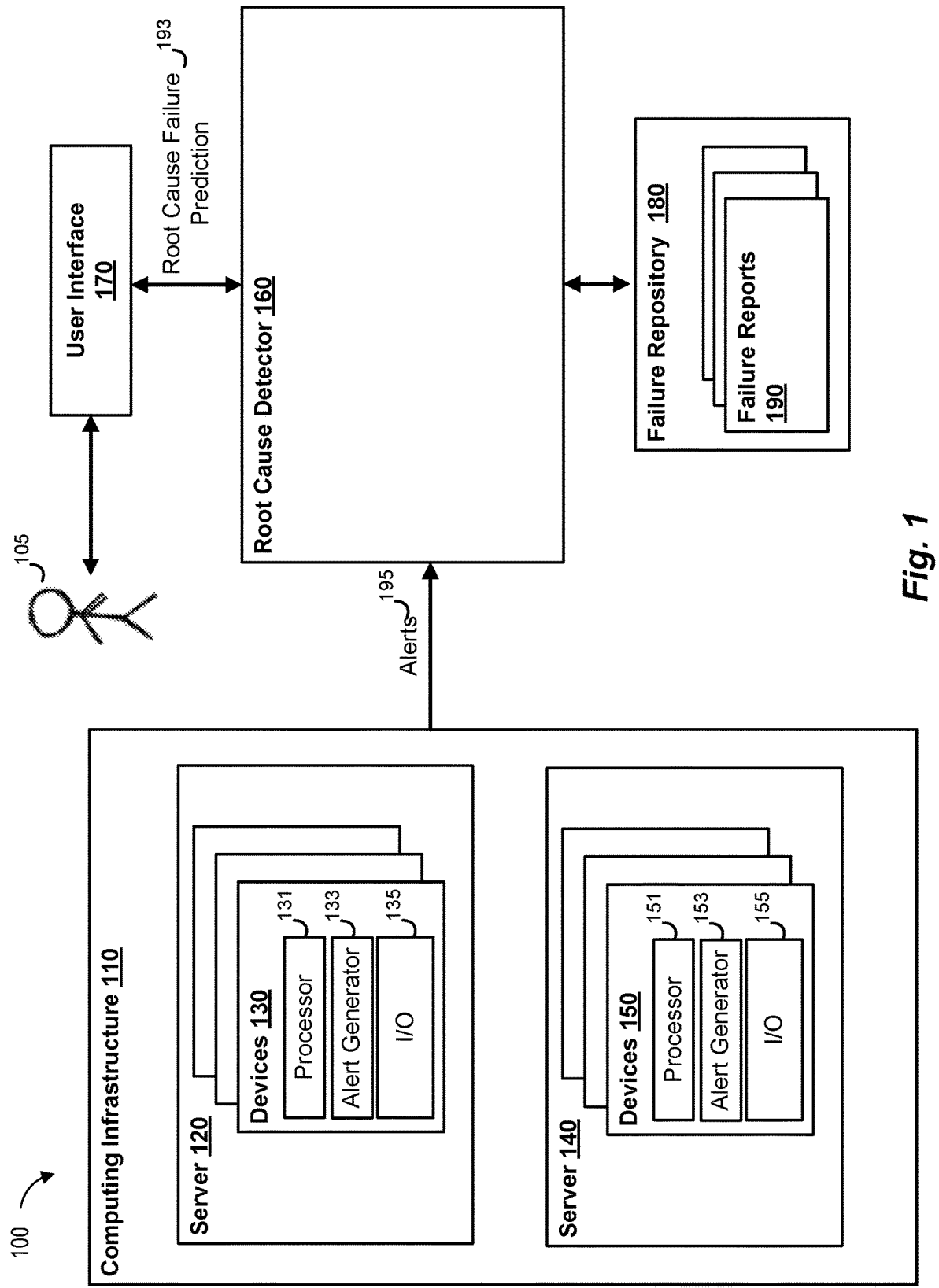
FIG. 1 illustrates a system for detecting a root cause failure according to some embodiments.

FIG. 1 illustrates a system for detecting a root cause failure according to some embodiments. System 100 includes administrator 105, computing infrastructure 110, root cause detector 160, user interface 170, and failure repository 180. Computing infrastructure 110 may be a data center that includes multiple devices that are interconnected. As shown here, computing infrastructure 110 includes server 120 and server 140. Server 120 includes devices 130 which are interconnected and each device within devices 130 includes processor 131, alert generator 133, and input/output 135. Similarly, server 140 includes devices 150 which are interconnected and each device within devices 150 includes processor 151, alert generator 153, and input/output 155.

In the production environment, devices within computing infrastructure 110 may generate alerts. The alerts generated may include non-critical alerts (e.g., an alert notification that the operating temperature of the device is cooler or hotter than normal) and critical alerts (e.g., device is malfunctioning). Since many devices within computing infrastructure 110 are generating alerts, the alerts may include a time stamp indicating when the alert was generated. Alerts 195 may include all alerts generated by devices within computing infrastructure 110. Depending on the implementation details, root cause detector 160 may receive alerts from a specific server or from all servers. For example, alerts 195 may include alerts generated by a single server in computing infrastructure 110. Similarly, root cause detector 160 may receive alerts as they are generated or in batches. For example, alerts 195 may be received at root cause detector 160 as they are being generated by devices within computing infrastructure 110. As another example, root cause detector 160 may periodically query computing infrastructure 110 for any new alerts that have been generated since the last time root cause detector 160 received alerts. As yet another example, root cause detector 160 may query computing infrastructure 110 for alerts 195 in response to detecting a system failure or outage in computing infrastructure 110. In other words, root cause detector 160 may retrieve the alerts for analysis after a critical system failure has occurred to analyze the alerts to determine the root cause of the system failure. An exemplary alert data structure is included in FIG. 3. It can also receive alerts from non-critical events.

Root cause detector 160 is configured diagnose a system failure within the computing infrastructure 110. Root cause detector 160 may analyze alerts 195 to automatically detect whether a failure within a device of computing infrastructure 110 is the root cause of the system failure, which is also known as the root cause failure. Once the root cause failure has been identified, countermeasures or repairs may be automatically performed on the device with the root cause failure to repair computing infrastructure 110.

As mentioned above, the devices in computing infrastructure 110 are interconnected. This means that a failure in one device may lead to failures in other devices, which may ultimately end in a critical failure of the system. The root cause failure is the initial failure that triggered this chain of events. In one embodiment, root cause detector 160 may use a classifier model to compare alerts 195 with known root cause failures stored in failure reports 190. Failures in computing infrastructure are deterministic so therefore when a failure in the system occurs due to a failure in the device, replicating that failure in the device should lead to the same alert pattern that is connected to the failure. A failure report stores the root cause failure and the alerts that were generated in response to the root cause failure. Root cause detector 160 may compare failure reports with the sequence of alerts from alerts 195 to determine whether the same root cause failure has occurred or is taking place. As shown here, root cause detector 160 is coupled to failure repository 180 which stores failure reports 190. In some embodiments, root cause detector 160 may predict a root cause failure from the sequence of alerts, generate a new failure report from the sequence of alerts and the predicted root cause failure, and then store the new failure report in failure repository 180. Administrator 105 may communicate with root cause detector 160 through user interface 170. In one embodiment, administrator 105 may manually instruct root cause detector 160 to detect a root cause failure in computing infrastructure 110. Root cause failure prediction 193 may be generated by root cause detector 160 and shared with administrator 105 via user interface 170. In another embodiment, root cause detector 160 may be configured to continuously analyze alerts from computing infrastructure 110 for potential root cause failures and transmit results from the analysis such as root cause failures to administrator 105 via user interface 170.

Figure 2:
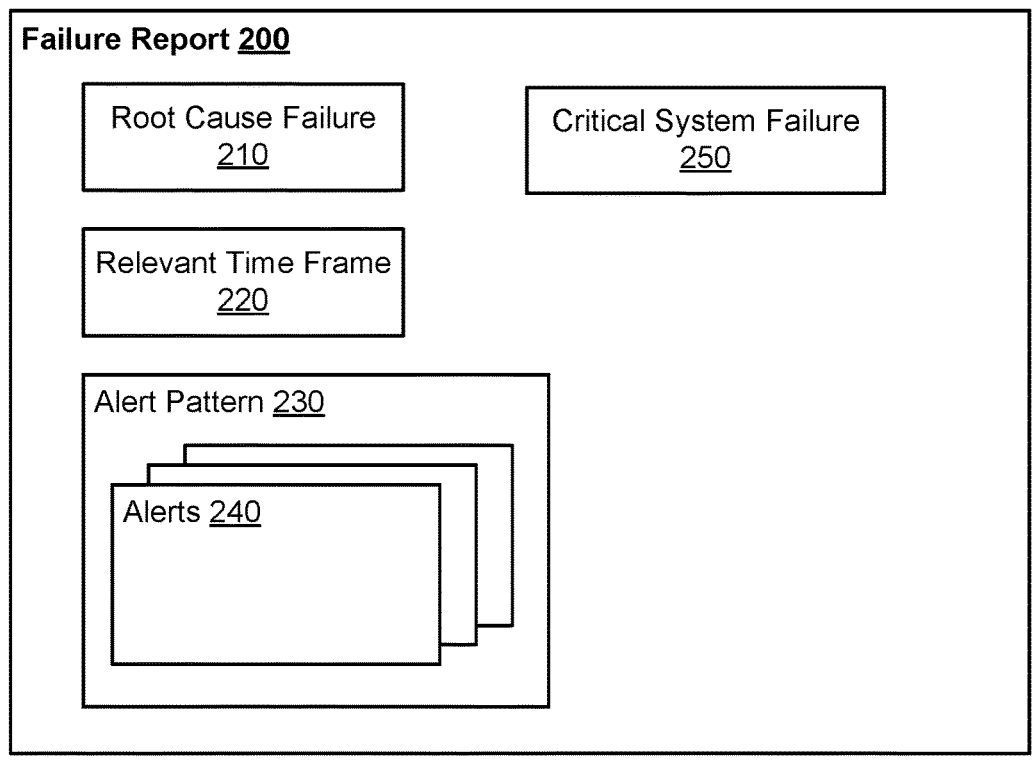
FIG. 2 illustrates an exemplary failure report data structure according to some embodiments.

FIG. 2 illustrates an exemplary failure report data structure according to some embodiments. Failure report 200 can associate an alert pattern to a root cause failure. A root cause detector may utilize failure report 200 to compare the similarity of the alert pattern in a report to a sequence of alerts received from a computing infrastructure in the production environment. If there is a high correlation or similarity in the alerts, the root cause detector may predict that the root cause failure described in failure report 200 is also the root cause failure of what's currently occurring in the computing infrastructure. In one example, failure report 200 can be stored in failure repository 180 of FIG. 1.

Failure report 200 includes root cause failure 210, relevant time frame 220, alert pattern 230, and critical system failure 250. Root cause failure 210 is the failure within a device that is associated with the alert pattern 230, which includes alerts 240. Root cause failure 210 eventually results in critical system failure 250. In other words, there is causality between root cause failure 210 and critical system failure 250. In one scenario when the root cause failure 210 occurs, it triggers the generation of alert pattern 230 by the devices in the computing infrastructure within relevant time frame 220. Relevant time frame 220 may define a period of time in which alerts generated by the computing infrastructure are considered part of the alert pattern after the root cause failure has occurred or while they develop. It's important to set a relevant time frame that is optimal since a time frame that is too short may result in multiple root cause failures having the same alert pattern while a time frame that is too long may result in a larger alert pattern. Larger alert pattern may require more compute power when comparing the alert pattern and therefor is less efficient while containing alerts that are not related to the current root cause which make the data noisy. Each failure report may have a unique relevant time frame 220 depending on the amount of time required for a unique set of alerts to be generated in response to root cause failure 210. In some instances where two different root cause failures are found to have the same alert pattern, additional monitor probes may be introduced into the computing infrastructure, thereby introducing new alerts so that the alert pattern of the two root cause failures are unique.

Figure 3:
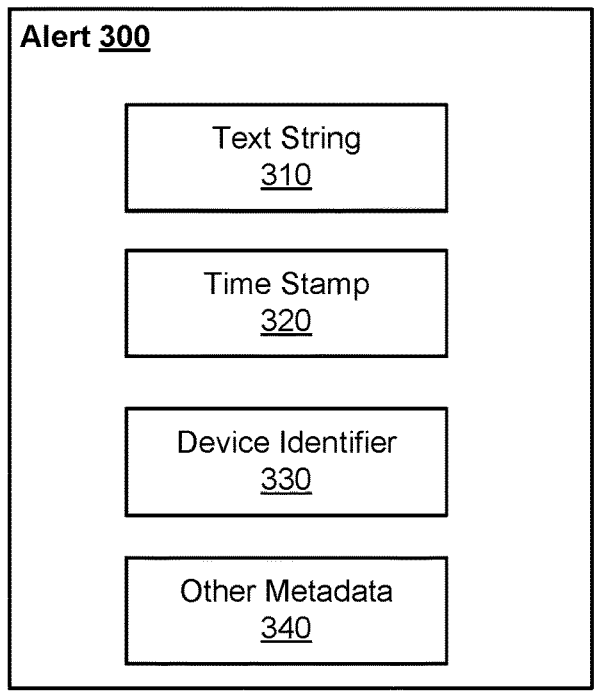
FIG. 3 illustrates an exemplary alert data structure according to some embodiments.

FIG. 3 illustrates an exemplary alert data structure according to some embodiments. Alert 300 can be an alert received by root cause detector 160 from computing infrastructure 110 of FIG. 1. As shown, alert 300 includes text string 310. Text string 310 is a string of text that describes alert 300. Text string 310 may be useful so that users and administrators can better understand the issue related to alert 300. Alert 300 also includes time stamp 320 that describes when alert 300 was generated. In one example, time stamp 320 may be in the format of date and time. In one embodiment, time stamp 320 is useful when grouping alerts based on when they were generated. Alert 300 further includes device identifier 330 which uniquely identifies the device that generated the alert. In some examples, each device in the computing infrastructure is associated with a unique identifier that identifies the device from other devices in the computing infrastructure. Alert 300 may further include other metadata 340 such as the type of device that generated the alert (e.g., memory module, router, switch, CPU, etc.) and error codes that provide information about the kind of issue that takes place on the corresponding device.

Figure 4:
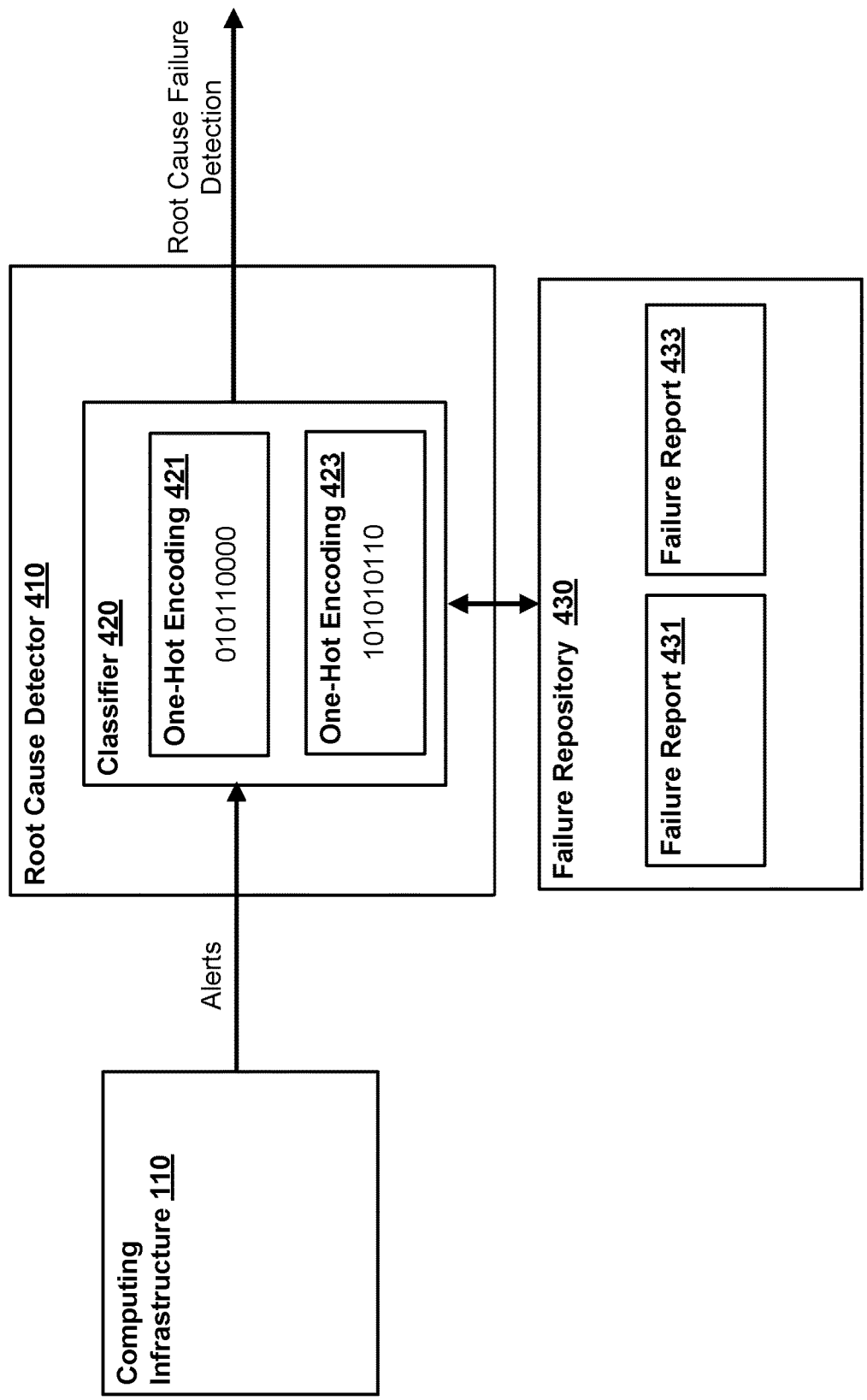
FIG. 4 illustrates an exemplary root cause detector according to some embodiments.

FIG. 4 illustrates an exemplary root cause detector according to some embodiments. As shown, root cause detector 410 includes classifier 420. Classifier 420 may be configured to encode the alert pattern from failure reports in failure repository 430 so that the alert pattern can be better utilized by machine learning algorithms. In one example, the encoding may be one-hot encoding format where every possible alert that may be generated by the devices in computing infrastructure 110 is represented as a bit string. A bit with value of 1 represents that the alert is present while a with a value of 0 represents that the alert is not present. Other types of encoding may also be implemented. Here, classifier 420 may process failure report 431 and generate one-hot encoding 421 from the alert pattern of failure report 431. Each bit in the bit string "01011000" can represent an alert where a value of 1 represents that the alert is present in the alert pattern while a value of 0 represents that the alert is not present in the alert pattern. Similarly, classifier may process failure report 433 and generate one-hot encoding 423 from the alert pattern of failure report 433. The one-hot encodings can in turn be used to train the classifier to detect root cause failures described in the failure reports in the failure repository 430.

Once classifier 420 has been trained with the failure reports in failure repository 430, classifier 420 is ready to automatically detect the root cause failures in the production environment that it has knowledge of, mainly the root cause failures that are in failure repository 430. Root cause detector 410 may receive alerts from computing infrastructure 110. In one embodiment, the alerts may be received sequentially as they are generated. In another embodiment, the alerts may be received as a collection of alerts that have been generated. Classifier 420 may receive these alerts and determine if a portion of the alerts match one of the one-hot encodings. When there is a match, classifier 420 may determine that the root cause failure associated with the matched one-hot encoding has occurred in the production environment. Root cause detector 410 can return the determined root cause failure to the administrator for further investigation. This may be desirable to the administrator because it may reduce the time and effort spent troubleshooting a critical system failure in the production environment by reducing time spent detecting and resolving the root cause failure.

Figure 5:
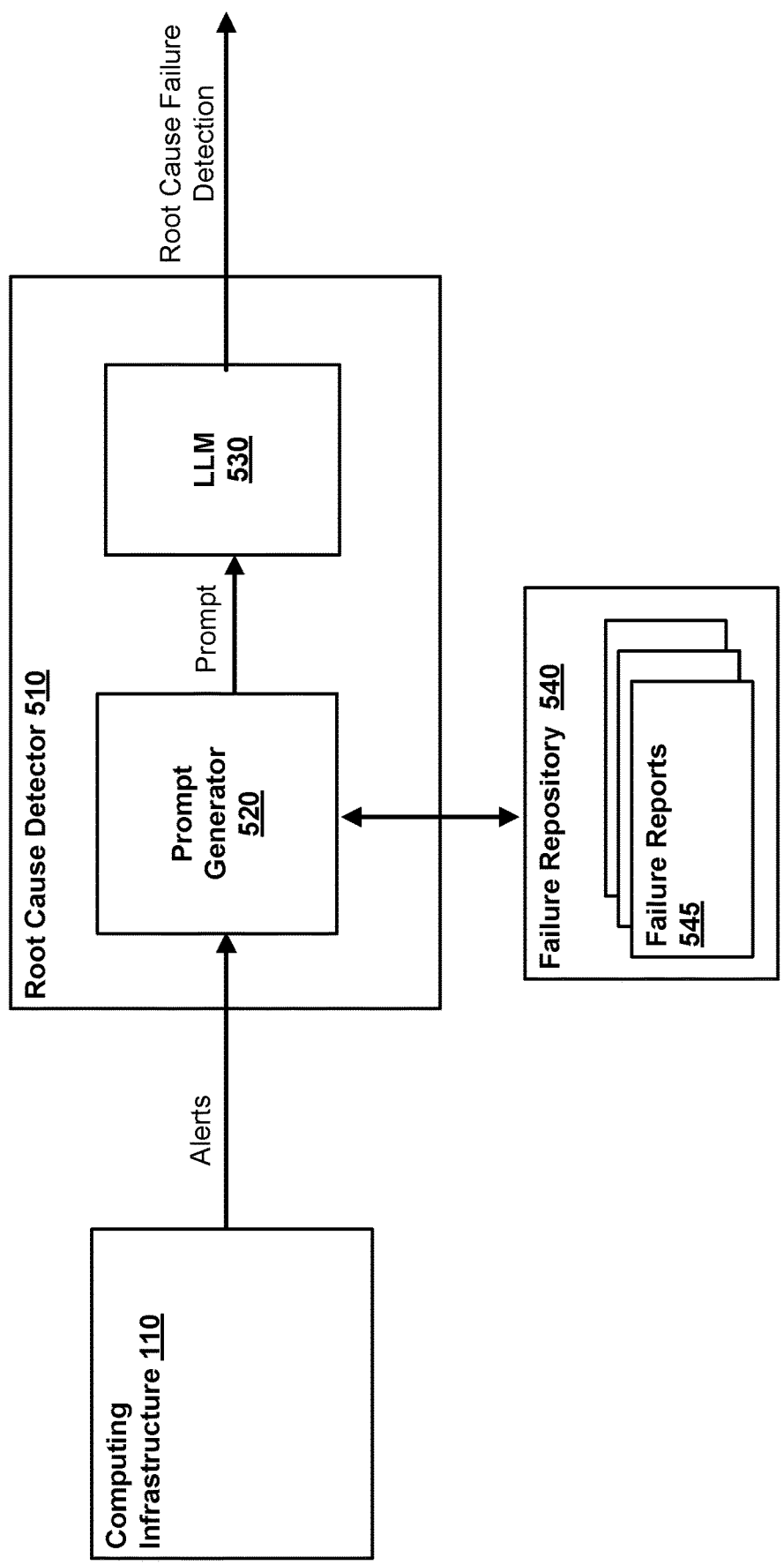
FIG. 5 illustrates another exemplary root cause detector according to some embodiments.

FIG. 5 illustrates another exemplary root cause detector according to some embodiments. While root cause detector 410 is based on a classifier model, root cause detector 510 is based on a large language model (LLM). Root cause detector 510 includes prompt generator 520 and LLM 530. Prompt generator 520 may be configured to generate a prompt that can in turn be received as an input by LLM 530 to analyze the current sequence of alerts to automatically detect the root cause failure. In some embodiments, the prompt may include a dynamic portion that is based on the current alerts received from the production environment and a static portion that is based on failure reports in the failure repository 540. Advantages to a larger prompt with a static and dynamic portion is that the LLM does not need to be trained like a traditional LLM. In one embodiment, the dynamic portion may include a text string from alerts that have been received from the production environment. The collection of text strings can form the dynamic portion of the prompt. An example of the dynamic portion is the following text: "Given the current sequence of alerts, is a failure going on?<insert text string from the sequence of alerts>. If yes which device is affected?Provide the device's name and a counter measure to reconstitute the healthy operation mode (of the device or data center)."

In one embodiment, the static portion may include text describing one or more failure reports from failure repository 545. The failure reports described in the static portion may be used by the LLM to analyze the dynamic portion of the prompt. For example, the static portion may include a failure report having an alert pattern having at least one alert that is in the dynamic portion of the prompt. The static portion may describe the system failure that occurred in computing infrastructure 110, the alerts that were generated, the topology of the computing infrastructure, the root cause failure, and successful countermeasures to correct or minimize the effect of the critical system failure. Description for the alerts generated may include the text strings associated with the alerts. The topology of the computing infrastructure may describe how the devices are interconnected which may help the LLM understand how the alerts are connected and related to one another. An example of the static portion is the following text: "When in the data center fault . . . is going on, there are the following active alerts. <insert text string from the sequence of alerts> . . . . The alerts are connected via . . . (here topology information can be provided to the LLM). In the presented example root cause was . . . and the device . . . had the following issue: . . . Successful counter measures were . . . "

Once the prompt has been generated, it may be transmitted from prompt generator 520 to LLM 530. LLM 530 processes the prompt and returns a root cause failure prediction if one is available. The root cause failure prediction can be transmitted to the administrator or user via the user interface. The administrator or user may in turn investigate the device identified as the root cause failure, which may lead to implementing countermeasures or repairing the device. In order to keep the number of LLM API calls small, the calls may be event based when active alert pattern changes and in the pipeline before the LLM certain rules may be fulfilled such that a heuristic may decide it is worth a call of the LLM. Each change (within some reasonable waiting time not to trigger too often) triggers a call of the automated root cause detection service. In addition, a minimum time between two calls can be set.

Since the root cause detector 510 is capable of detecting root cause failures that are in failure reports within the failure repository 540, increasing the number of failure reports and the number of root cause failures documented in the failure reports will increase the capability of root cause detector 510. A failure report generator may generate new failure reports for failure repository 540. In one embodiment, a failure report generator can generate a new failure report from the sequence of alerts and the system failure or fault currently being analyzed in the production environment. This is known as a post-mortem analysis approach. Root cause detector 510 may analyze a sequence of alerts to predict a root cause failure. In one example, root cause detector may transmit the predicted root cause failure to the administrator who in turn investigates the device associated with the root cause failure to determine if in fact the predicted root cause failure is the cause of system fault in the production environment. In another example, root cause detector may transmit the predicted root cause failure to the computing infrastructure which in turn runs diagnostics on the device associated with the root cause failure to determine if in fact the predicted root cause failure is the cause of the system fault in the production environment. Failure report generator may in turn use the results of the investigation or diagnostics (whether the predicted root cause failure was correct) and the sequence of alerts to generate a new failure report. This is advantageous because new failure reports can be generated from issues experienced in the production environment.

Figure 6:
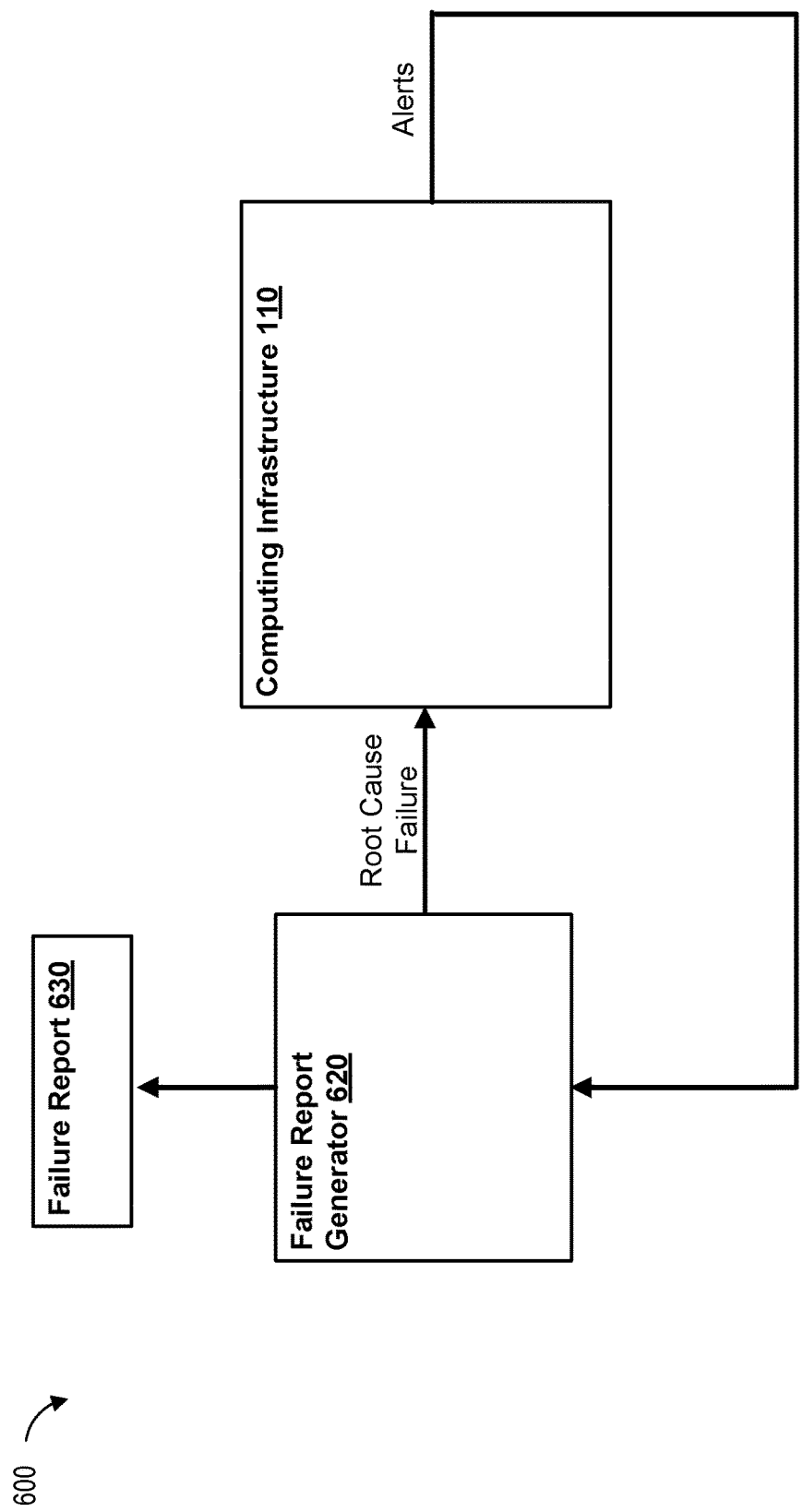
FIG. 6 illustrates an exemplary system for generating failure reports according to some embodiments.

FIG. 6 illustrates an exemplary system for generating failure reports according to some embodiments. Here, system 600 includes computing infrastructure 110, failure report generator 620, and failure report 630. Failure report generator 620 may be configured to introduce root cause failures into computing infrastructure 110 in a test environment. This is also known as a chaos engineering approach where an issue is intentionally introduced into the environment and then the alerts generated in response to the issue are tracked. Since alerts generated in response to an issue is deterministic, it's possible to work backwards by analyzing a set of alerts to determine the root cause failure. After introduction of a root cause failure into computing infrastructure 110, a sequence of alerts may be generated. Failure report generator 620 may track the sequence of alerts to identify alerts that are relevant to the root cause failure that was intentionally introduced into the environment to set the relevant time parameter in the failure report. Relevant alerts may be alerts that are related to the root cause failure. For example, if the root cause failure intentionally introduced was a broken memory module, then failure report generator 620 may scan the sequence of alerts received for an alert related to an issue with a memory module in the system. Once relevant alerts have been identified, the relevant time can be set. As mentioned above, the relevant time defines the length of time that alerts should be collected after a root cause failure. In one embodiment, the relevant time may be set to the length of time that starts with when the root cause failure is introduced into the computing infrastructure and ends with when the relevant alerts have been received. The end time may depend on when the relevant alert is received by the failure report generator or it may be set to the time stamp of when the relevant alert was generated. In another embodiment, the relevant time may be set to the length of time that starts with when the root cause failure is introduced into the computing infrastructure and ends with when the system failure is detected. With the root cause failure, the relevant time, topography of the connections between devices, and the alert pattern received from the computing infrastructure, failure report generator 620 has all the pieces to generate a failure report. Additionally to alerts that are connected to root causes, the prompt can also be enriched with further information. For example, an alert pattern may be provided to the LLM but instead of classifying as harmless, suggested a root cause that was not present. In such a case, to avoid such future false positives, the corresponding alert pattern can be included into the static part of the prompt or any training set with a note that this alert pattern was not associated with a root cause but instead the system was in a healthy status.

Figure 7:
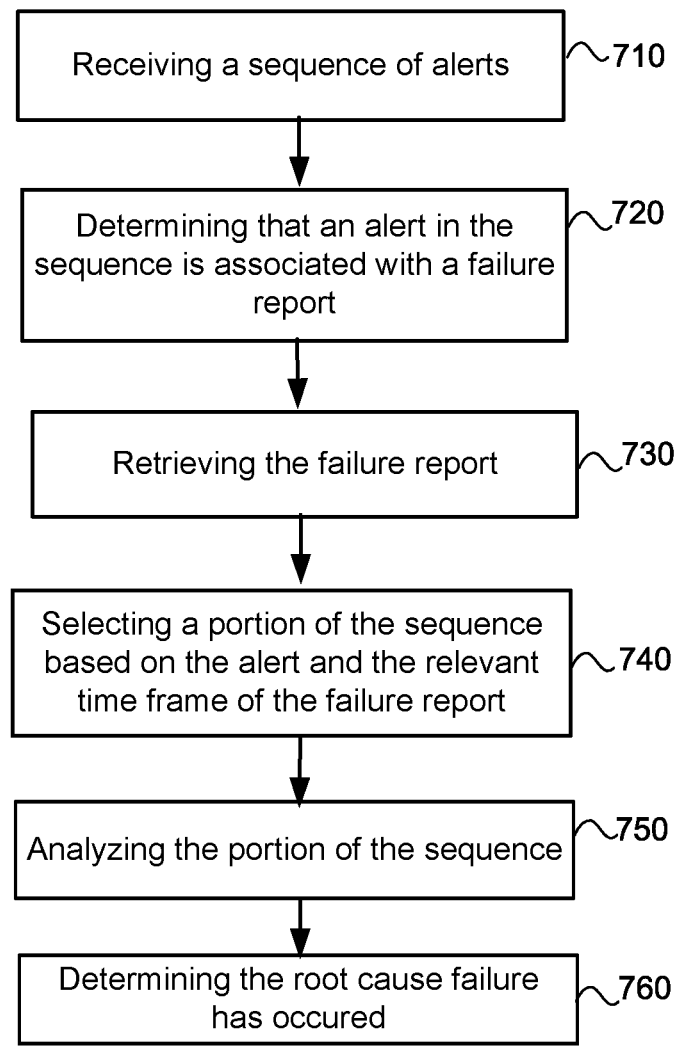
FIG. 7 illustrates a workflow for detecting a root cause failure according to some embodiments.

FIG. 7 illustrates a workflow for detecting a root cause failure according to some embodiments. Workflow 700 may be implemented in software, stored in computer readable medium, and executed by a processor, for example a processor of root cause detector. Workflow 700 begins with receiving a sequence of alerts at step 710. The sequence of alerts may have been generated by a plurality of devices in a computing infrastructure in a production environment. Each alert from the sequence of alerts may have been generated by a device from the plurality of devices. Workflow 700 may continue by determining that an alert in the sequence of alerts is associated with a failure report at step 720. Association with the failure report can mean that the alert can be found in the failure report. In one example, the alert can be found in the alert pattern stored in the failure report. The failure report may also include a root cause failure, a critical system failure that resulted in response to the root cause failure, and a relevant time frame. The failure report may be stored in a failure repository. Workflow 700 then continues by retrieving the failure report from the failure repository at step 730.

Workflow 700 continues by selecting a portion of the sequence of alerts based on the alert and the relevant time frame of the failure report at step 740. In one example, the alert and the relevant time define the boundaries in time the select alerts from the sequence of alerts. For example, the sequence of alerts may include alerts at time 10:01 am, 10:02 am, 10:03 am, 10:04 am, 10:05 am. The alert and relevant time may define the boundaries in time to select alerts at all alerts between 10:01 am and 10:03 am. As a result, the portion of the sequence of alerts would be alerts in the sequence of alerts that were generated between 10:01 and 10:03 am. In one example, we may calculate the period of time from the time stamp of the alert and the relevant time frame of the failure report where the period of time starts with the time stamp of the alert and ends with the time stamp of the alert plus the relevant time frame. In another embodiment, workflow 700 may select a portion of the sequence of alerts based on topology of the devices and the failure report. For example if the failure report is a hardware failure which is caused by root causes in a server, workflow 700 can search through all the servers and compare with their last alert status (all alerts that are triggered by this server), leaving out all alerts from other servers since hardware issues may be very unlikely triggered by other servers. Similarly, if there is a suspicious alert from a network device (e.g., analyzed by some pre-analyzing heuristic), then also alerts from connected devices should be clustered to a portion of alerts that are provided to the dynamic portion of the alert. Workflow 700 continues by analyzing the portion of the sequence of alerts and the alert pattern of the failure report at step 750. The analysis aims are comparing the portion of the sequence of alerts with the alert pattern to determine whether they are similar. In one embodiment, the analysis may be performed through a classifier model. The classifier may be trained using failure reports from the failure repository. In one example, the alert patterns in the failure reports are stored using one-hot encoding format. In another embodiment, the analysis may be performed through an LLM. In the case of the LLM, a prompt may be generated for the LLM that includes both a static portion and a dynamic portion. The dynamic portion may be based on the sequence of alerts received from the computing infrastructure. In one example, the dynamic portion can include the text from alerts within a portion of the sequence of alerts for comparison. The static portion may be based on the failure reports in the failure repository. Since smaller prompts use up less resources and can be processed quicker, it may be desirable to preselect failure reports to include in the static portion based on the dynamic portion. For example, the method may preselect examples of failure reports related to issues with memory modules when the dynamic portion contains alerts related to a memory fault. Workflow 700 then continues by determining that the root cause failure of the relevant report has occurred in the production environment in response to the analysis at step 760. In one example, the determination is made when the analysis concludes that the sequence of alerts and the alert pattern are similar. Furthermore, the corresponding failure reports for the static prompt can be assembled from a vector database. In a vector database, text and their corresponding vector embedding is stored to find failure reports with similar context modeled by a vector that is close to the corresponding vector embedding of the alert pattern. Furthermore, the corresponding LLM can be fine-tuned by including the failure reports into the training set on which an LLM is trained or fine-tuned.

Figure 8:
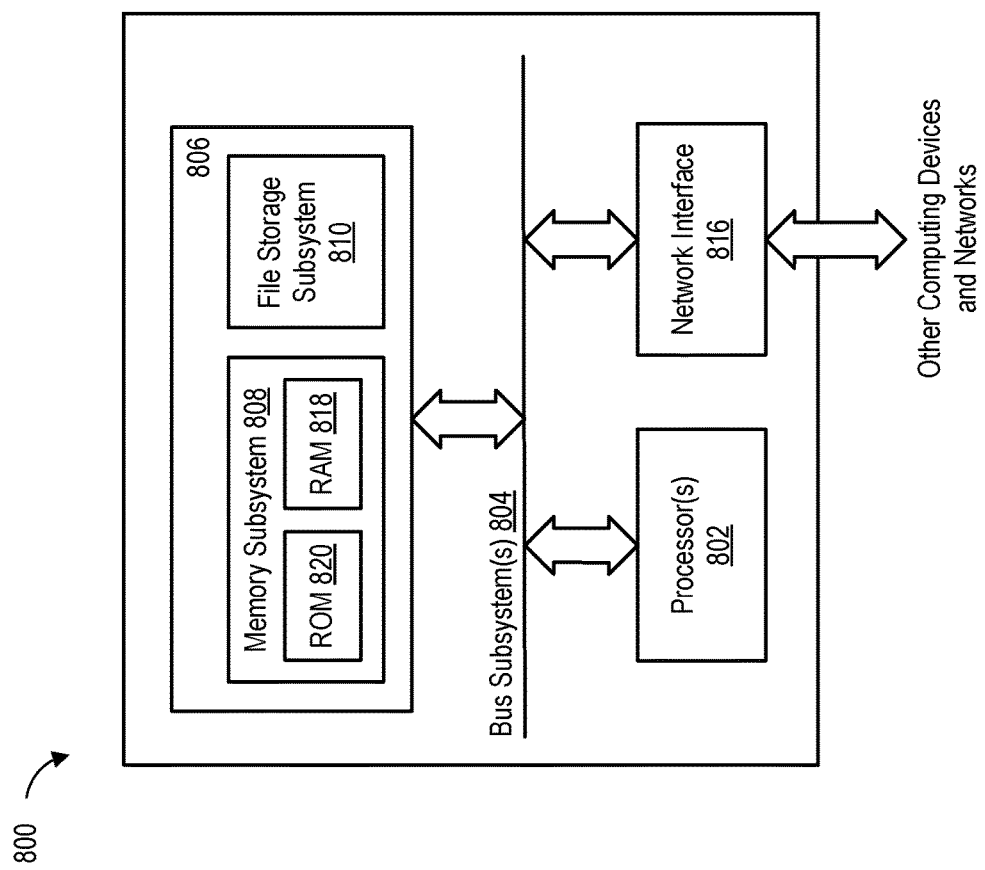
FIG. 8 depicts a simplified block diagram of an example computer system 400, which can be used to implement some of the techniques described in the foregoing disclosure.

FIG. 8 depicts a simplified block diagram of an example computer system 800, which can be used to implement some of the techniques described in the foregoing disclosure. As shown in FIG. 8, system 800 includes one or more processors 802 that communicate with several devices via one or more bus subsystems 804. These devices may include a storage subsystem 806 (e.g., comprising a memory subsystem 808 and a file storage subsystem 810) and a network interface subsystem 816. Some systems may further include user interface input devices and/or user interface output devices (not shown).

Bus subsystem 804 can provide a mechanism for letting the various components and subsystems of system 800 communicate with each other as intended. Although bus subsystem 804 is shown schematically as a single bus, alternative embodiments of the bus subsystem can utilize multiple buses.

Network interface subsystem 816 can serve as an interface for communicating data between system 800 and other computer systems or networks. Embodiments of network interface subsystem 816 can include, e.g., Ethernet, a Wi-Fi and/or cellular adapter, a modem (telephone, satellite, cable, etc.), and/or the like.

Storage subsystem 806 includes a memory subsystem 808 and a file/disk storage subsystem 810. Subsystems 808 and 810 as well as other memories described herein are examples of non-transitory computer-readable storage media that can store executable program code and/or data that provide the functionality of embodiments of the present disclosure.

Memory subsystem 808 comprise one or more memories including a main random-access memory (RAM) 818 for storage of instructions and data during program execution and a read-only memory (ROM) 820 in which fixed instructions are stored. File storage subsystem 810 can provide persistent (e.g., non-volatile) storage for program and data files, and can include a magnetic or solid-state hard disk drive, an optical drive along with associated removable media (e.g., CD-ROM, DVD, Blu-Ray, etc.), a removable flash memory-based drive or card, and/or other types of storage media known in the art.

It should be appreciated that system 800 is illustrative and many other configurations having more or fewer components than system 800 are possible.

The above description illustrates various embodiments of the present invention along with examples of how aspects of the present invention may be implemented. The above examples and embodiments should not be deemed to be the only embodiments and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

FURTHER EXAMPLES

Each of the following non-limiting features in the following examples may stand on its own or may be combined in various permutations or combinations with one or more of the other features in the examples below. In various embodiments, the present disclosure may be implemented as a processor or method.

In some embodiments the present disclosure includes a method comprising receiving a sequence of alerts from a plurality of devices in a computing infrastructure of a production environment, wherein each alert is generated by one of the plurality of devices and includes a text string describing the alert, a time stamp indicating when the alert was generated, and a unique device identifier indicating the device from the plurality of devices that generated the alert; determining that an alert from the sequence of alerts is associated with a failure report in a failure repository, the failure repository storing a plurality of failure reports, wherein each failure report includes a root cause failure, a critical system failure that resulted in response to triggering the root cause failure, a relevant time frame to scan for alerts after the triggering root cause failure, and an alert pattern, the alert pattern including at least one alert that is generated in response to triggering the root cause failure; retrieving the failure report from the failure repository; selecting a portion of the sequence of alerts based on the alert and the relevant time frame of the failure report; analyzing the portion of the sequence of alerts and the alert pattern of the failure report; and transmitting a notification that predicts the root cause failure of the failure report has occurred in the production environment in response to the analysis.

In one embodiment, determining that the alert is associated with the failure report includes determining that the alert pattern of the failure report includes the alert.

In one embodiment, selecting the portion of the sequence of alerts includes: calculating a period of time from the time stamp of the alert and the relevant time frame of the failure report; and selecting the portion of the sequence of alerts, wherein each alert in the portion of the sequence of alerts has a time stamp during the period of time.

In one embodiment, the period of time begins at the time stamp of the alert and ends at the time stamp of the alert plus the relevant time frame.

In one embodiment, selecting the portion of the sequence of alerts includes selecting the sequence of alerts based on a topology of the plurality of devices.

In one embodiment, the alert pattern is stored using one-hot encoding format and a classifier is trained based on the alert patterns from the plurality of failure reports.

In one embodiment, analyzing the portion of the sequence of alerts includes processing the portion of the sequence of alerts through the classifier to determine a match with the failure report.

In one embodiment, wherein analyzing the portion of the sequence of alerts includes: generating a prompt for a large language model from the text string of each alert in the portion of the sequence of alerts; and processing the prompt through the large language model to determine whether the root cause failure is associated with the portion of the sequence of alerts.

In one embodiment, generating the prompt for the large language model includes: generating a dynamic portion of the prompt from the text string of each alert in the portion of the sequence of alerts; identifying one or more failure reports that are relevant to the alert from the sequence of alerts; and generating a static portion of the prompt from the text string of each alert in the alert patterns of the one or more failure reports.

In one embodiment, the failure report is generated by introducing the root cause failure into the computing infrastructure in a test environment and collecting the alerts generated in response to the root cause failure.

In some embodiments, the present disclosure includes a system comprising: one or more processors; a non-transitory computer-readable medium storing a program executable by the one or more processors, the program comprising sets of instructions for: receiving a sequence of alerts from a plurality of devices in a computing infrastructure of a production environment, wherein each alert is generated by one of the plurality of devices and includes a text string describing the alert, a time stamp indicating when the alert was generated, and a unique device identifier indicating the device from the plurality of devices that generated the alert; determining that an alert from the sequence of alerts is associated with a failure report in a failure repository, the failure repository storing a plurality of failure reports, wherein each failure report includes a root cause failure, a critical system failure that resulted in response to triggering the root cause failure, a relevant time frame to scan for alerts after the triggering root cause failure, and an alert pattern, the alert pattern including at least one alert that is generated in response to triggering the root cause failure; retrieving the failure report from the failure repository; selecting a portion of the sequence of alerts based on the alert and the relevant time frame of the failure report; analyzing the portion of the sequence of alerts and the alert pattern of the failure report; and transmitting a notification that predicts the root cause failure of the failure report has occurred in the production environment in response to the analysis.

In some embodiments, the present disclosure includes a non-transitory computer-readable medium storing a program executable by one or more processors, the program comprising sets of instructions for: receiving a sequence of alerts from a plurality of devices in a computing infrastructure of a production environment, wherein each alert is generated by one of the plurality of devices and includes a text string describing the alert, a time stamp indicating when the alert was generated, and a unique device identifier indicating the device from the plurality of devices that generated the alert; determining that an alert from the sequence of alerts is associated with a failure report in a failure repository, the failure repository storing a plurality of failure reports, wherein each failure report includes a root cause failure, a critical system failure that resulted in response to triggering the root cause failure, a relevant time frame to scan for alerts after the triggering root cause failure, and an alert pattern, the alert pattern including at least one alert that is generated in response to triggering the root cause failure; retrieving the failure report from the failure repository; selecting a portion of the sequence of alerts based on the alert and the relevant time frame of the failure report; analyzing the portion of the sequence of alerts and the alert pattern of the failure report; and transmitting a notification that predicts the root cause failure of the failure report has occurred in the production environment in response to the analysis.

What is claimed is:

1. A method, comprising:
   receiving a sequence of alerts from a plurality of devices in a computing infrastructure of a production environment, wherein each alert is generated by one of the plurality of devices and includes a text string describing the alert, a time stamp indicating when the alert was generated, and a unique device identifier indicating the device from the plurality of devices that generated the alert;
   determining that an alert from the sequence of alerts is associated with a failure report in a failure repository, the failure repository storing a plurality of failure reports, wherein each failure report includes a root cause failure, a critical system failure that resulted in response to triggering the root cause failure, a relevant time frame to scan for alerts after the triggering root cause failure, and an alert pattern, the alert pattern including at least one alert that is generated in response to triggering the root cause failure;
   retrieving the failure report from the failure repository;
   selecting a portion of the sequence of alerts based on the alert and the relevant time frame of the failure report;
   analyzing the portion of the sequence of alerts and the alert pattern of the failure report; and
   transmitting a notification that predicts the root cause failure of the failure report has occurred in the production environment in response to the analysis.

2. The method as in claim 1, wherein determining that the alert is associated with the failure report includes determining that the alert pattern of the failure report includes the alert.

3. The method as in claim 1, wherein selecting the portion of the sequence of alerts includes:
   calculating a period of time from the time stamp of the alert and the relevant time frame of the failure report; and
   selecting the portion of the sequence of alerts, wherein each alert in the portion of the sequence of alerts has a time stamp during the period of time.

4. The method as in claim 3, wherein the period of time begins at the time stamp of the alert and ends at the time stamp of the alert plus the relevant time frame.

5. The method as in claim 1, wherein selecting the portion of the sequence of alerts includes selecting the sequence of alerts based on a topology of the plurality of devices.

6. The method as in claim 1, wherein the alert pattern is stored using one-hot encoding format and a classifier is trained based on the alert patterns from the plurality of failure reports.

7. The method as in claim 6, wherein analyzing the portion of the sequence of alerts includes processing the portion of the sequence of alerts through the classifier to determine a match with the failure report.

8. The method as in claim 1, wherein analyzing the portion of the sequence of alerts includes:
   generating a prompt for a large language model from the text string of each alert in the portion of the sequence of alerts; and
   processing the prompt through the large language model to determine whether the root cause failure is associated with the portion of the sequence of alerts.

9. The method as in claim 8, wherein generating the prompt for the large language model includes:
   generating a dynamic portion of the prompt from the text string of each alert in the portion of the sequence of alerts;
   identifying one or more failure reports that are relevant to the alert from the sequence of alerts; and
   generating a static portion of the prompt from the text string of each alert in the alert patterns of the one or more failure reports.

10. The method as in claim 1, wherein the failure report is generated by introducing the root cause failure into the computing infrastructure in a test environment and collecting the alerts generated in response to the root cause failure.

11. A system comprising:
    one or more processors;
    a non-transitory computer-readable medium storing a program executable by the one or more processors, the program comprising sets of instructions for:
    receiving a sequence of alerts from a plurality of devices in a computing infrastructure of a production environment, wherein each alert is generated by one of the plurality of devices and includes a text string describing the alert, a time stamp indicating when the alert was generated, and a unique device identifier indicating the device from the plurality of devices that generated the alert;
    determining that an alert from the sequence of alerts is associated with a failure report in a failure repository, the failure repository storing a plurality of failure reports, wherein each failure report includes a root cause failure, a critical system failure that resulted in response to triggering the root cause failure, a relevant time frame to scan for alerts after the triggering root cause failure, and an alert pattern, the alert pattern including at least one alert that is generated in response to triggering the root cause failure;
    retrieving the failure report from the failure repository;

selecting a portion of the sequence of alerts based on the alert and the relevant time frame of the failure report;

analyzing the portion of the sequence of alerts and the alert pattern of the failure report; and transmitting a notification that predicts the root cause failure of the failure report has occurred in the production environment in response to the analysis.

12. The system of claim 11, wherein determining that the alert is associated with the failure report includes determining that the alert pattern of the failure report includes the alert.

13. The system of claim 11, wherein selecting the portion of the sequence of alerts includes:

calculating a period of time from the time stamp of the alert and the relevant time frame of the failure report; and selecting the portion of the sequence of alerts, wherein each alert in the portion of the sequence of alerts has a time stamp during the period of time.

14. The system of claim 13, wherein the period of time begins at the time stamp of the alert and ends at the time stamp of the alert plus the relevant time frame.

15. The system of claim 11, wherein the alert pattern is stored using one-hot encoding format and a classifier is trained based on the alert patterns from the plurality of failure reports.

16. The system of claim 11, generating a prompt for a large language model from the text string of each alert in the portion of the sequence of alerts; and processing the prompt through the large language model to determine whether the root cause failure is associated with the portion of the sequence of alerts.

17. The system of claim 16, generating a dynamic portion of the prompt from the text string of each alert in the portion of the sequence of alerts;

identifying one or more failure reports that are relevant to the alert from the sequence of alerts; and generating a static portion of the prompt from the text string of each alert in the alert patterns of the one or more failure reports.

18. A non-transitory computer-readable medium storing a program executable by one or more processors, the program comprising sets of instructions for:

receiving a sequence of alerts from a plurality of devices in a computing infrastructure of a production environment, wherein each alert is generated by one of the plurality of devices and includes a text string describing the alert, a time stamp indicating when the alert was generated, and a unique device identifier indicating the device from the plurality of devices that generated the alert;

determining that an alert from the sequence of alerts is associated with a failure report in a failure repository, the failure repository storing a plurality of failure reports, wherein each failure report includes a root cause failure, a critical system failure that resulted in response to triggering the root cause failure, a relevant time frame to scan for alerts after the triggering root cause failure, and an alert pattern, the alert pattern including at least one alert that is generated in response to triggering the root cause failure;

retrieving the failure report from the failure repository;

selecting a portion of the sequence of alerts based on the alert and the relevant time frame of the failure report;

analyzing the portion of the sequence of alerts and the alert pattern of the failure report; and transmitting a notification that predicts the root cause failure of the failure report has occurred in the production environment in response to the analysis.

19. The non-transitory computer-readable medium of claim 18, wherein selecting the portion of the sequence of alerts includes:

calculating a period of time from the time stamp of the alert and the relevant time frame of the failure report; and selecting the portion of the sequence of alerts, wherein each alert in the portion of the sequence of alerts has a time stamp during the period of time.

20. The non-transitory computer-readable medium of claim 19, wherein the period of time begins at the time stamp of the alert and ends at the time stamp of the alert plus the relevant time frame.

* * * * *